United States Patent
Kang et al.

(10) Patent No.: US 7,321,944 B2
(45) Date of Patent: Jan. 22, 2008

(54) USER PROGRAMMING SYSTEM USING WEB SERVER FOR PRIVATE BRANCH EXCHANGE

(75) Inventors: Uk-Jin Kang, Daegukwangyeok-shi (KR); Seung-Ku Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 522 days.

(21) Appl. No.: 09/809,489

(22) Filed: Mar. 15, 2001

(65) Prior Publication Data

US 2002/0062362 A1 May 23, 2002

(30) Foreign Application Priority Data

Aug. 17, 2000 (KR) ................. 2000-47384

(51) Int. Cl.
*G06F 15/177* (2006.01)
*G06F 15/173* (2006.01)
*H04M 1/64* (2006.01)
*H04M 1/00* (2006.01)

(52) U.S. Cl. .............. 710/220; 709/221; 709/222; 709/223; 379/88.25; 455/554.1; 455/555

(58) Field of Classification Search ......... 709/220–223
See application file for complete search history.

(56) References Cited

U.S. PATENT DOCUMENTS

| | | | |
|---|---|---|---|
| 5,261,061 A * | 11/1993 | Ju ........................ 379/27.07 |
| 5,673,311 A | 9/1997 | Andruska et al. ........... 379/207 |
| 5,875,242 A * | 2/1999 | Glaser et al. ........... 379/201.05 |
| 5,940,834 A * | 8/1999 | Pinard et al. ............... 707/102 |
| 6,052,461 A * | 4/2000 | Lam .......................... 379/297 |
| 6,233,234 B1 * | 5/2001 | Curry et al. ................ 370/356 |
| 6,239,797 B1 * | 5/2001 | Hills et al. ................. 345/784 |
| 6,320,944 B1 * | 11/2001 | Schlossman et al. ....... 379/117 |
| 6,366,773 B1 * | 4/2002 | Ihara et al. ................ 455/419 |
| 6,542,497 B1 * | 4/2003 | Curry et al. ................ 370/352 |
| 6,636,503 B1 * | 10/2003 | Shiran et al. .............. 370/352 |
| 6,744,761 B1 * | 6/2004 | Neumann et al. .......... 370/389 |

FOREIGN PATENT DOCUMENTS

| | | |
|---|---|---|
| EP | 0 880 255 A | 11/1998 |
| EP | 0 948 220 A2 * | 10/1999 |
| JP | 11-289390 * | 10/1999 |
| WO | WO 98 16051 A | 4/1998 |
| WO | WO 00 51299 A | 8/2000 |

OTHER PUBLICATIONS

Hasselmeyer et al., Using CORBA and Java for PBX Management, Apr. 2000, pp. 353-365.
European Search Report, Jun. 12, 2001, Appl. No. EP 01 10 8957.

* cited by examiner

*Primary Examiner*—Alan S. Chen
(74) *Attorney, Agent, or Firm*—The Farrell Law Firm, PC

(57) ABSTRACT

A user programming system using a web server for a PBX is provided. A user program is loaded in the web server via a LAN interface. When necessary, a client accesses the web server by a general web browser and updates the user program on line or off line.

7 Claims, 3 Drawing Sheets

(PRIOR ART)

USER PROGRAMMING SYSTEM USING WEB SERVER FOR PRIVATE BRANCH EXCHANGE

PRIORITY

This application claims priority to an application entitled "User Programming System Using Web Server for Private Branch Exchange" filed in the Korean Industrial Property Office on Aug. 17, 2000 and assigned Ser. No. 2000-47384, the contents of which are hereby incorporated by reference.

BACKGROUND OF THE INVENTION

1. Field of the Invention

The present invention relates generally to programming a PBX (Private Branch Exchange) such as a key phone system, and in particular, to a user programming system utilizing a web server.

2. Description of the Related Art

A MMC (Man Machine Communication) in a PBX refers to storing data corresponding to a particular input function code in a memory. When a new card is inserted in a conventional PBX, MMC data of the system must be updated. In order to update a MMC, a system operator searches for MMC items such as needed for each card using an MMC program through a PC (Personal Computer) to increase efficiency.

In order to operate the PBX adaptively to the user environment, various options are programmed into a key phone or a telephone exclusively used for the PBX or programmed data is transmitted or received to or from the exchange system, using an application program for a specially fabricated PC. Another option is for a user to execute a program, through a complicated network, using a modem.

FIG. 1 illustrates remote connection to a conventional PBX using a modem. Referring to FIG. 1, in order to allow a user to program a PBX data is transmitted from a PC 18, through a telephone line using a modem, to a CO (Central Office) 14, to a PBX 10, which includes an SIO (Serial Input/Output) port, in order to allow a user to program PBX 10. PC 18 is in a remote place that is connected to a destination site through a built-in modem or an external modem 16 and for programming. Call routing is designated in the destination site for connection of a built-in modem or an external modem 12 to the PBX 10.

The disadvantage with utilizing the above method is that it is only viable if preliminary measures are taken and an office line is allocated to a specific extension line for continuous connection. Another disadvantage with the method utilized above is exhibited when a laptop computer is utilized to receive a remote program from a remote place in case the intended PC application program is not available on the laptop computer.

For a typical conventional method of utilizing a remote connection between a computer and a remote location a modem connection must be established. In this case, the laptop computer has to dial a remote place to receive the intended PC application program which delays the time in which the laptop computer can utilize the PC application program. Other disadvantages include a low transmission rate, the constraint of communication charge, the inconvenience of carrying a lap top computer or an application program, and the delay time associated with connecting a computer, through a telephone line, to a PBX.

Therefore, there exists a need for an apparatus or method that enables a user to easily program a PBX without the utilization of a telephone line.

SUMMARY OF THE INVENTION

It is, therefore, an object of the present invention to provide a system that enables a simple and easy way to program a PBX.

It is another object of the present invention to provide a user programming system for updating a program in a PBX.

It is a further object of the present invention to provide a user programming system for facilitating control and analysis of information in a PBX.

To achieve the above and other objects, there is provided a user programming system that utilizes a web server with a PBX. A user program is loaded onto the web server via a LAN interface. When necessary, a client accesses the web server by a general web browser and updates the user program on line or off line.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

As almost all information can be acquired through connection to LAN, it is possible to program system options from a remote place as if a user is located in the vicinity of a system. Based on this technology, the present invention is intended to provide a user programming method using a general-purpose web browser to connect a PBX to a web server then, load related data onto the web server.

Figure 1:
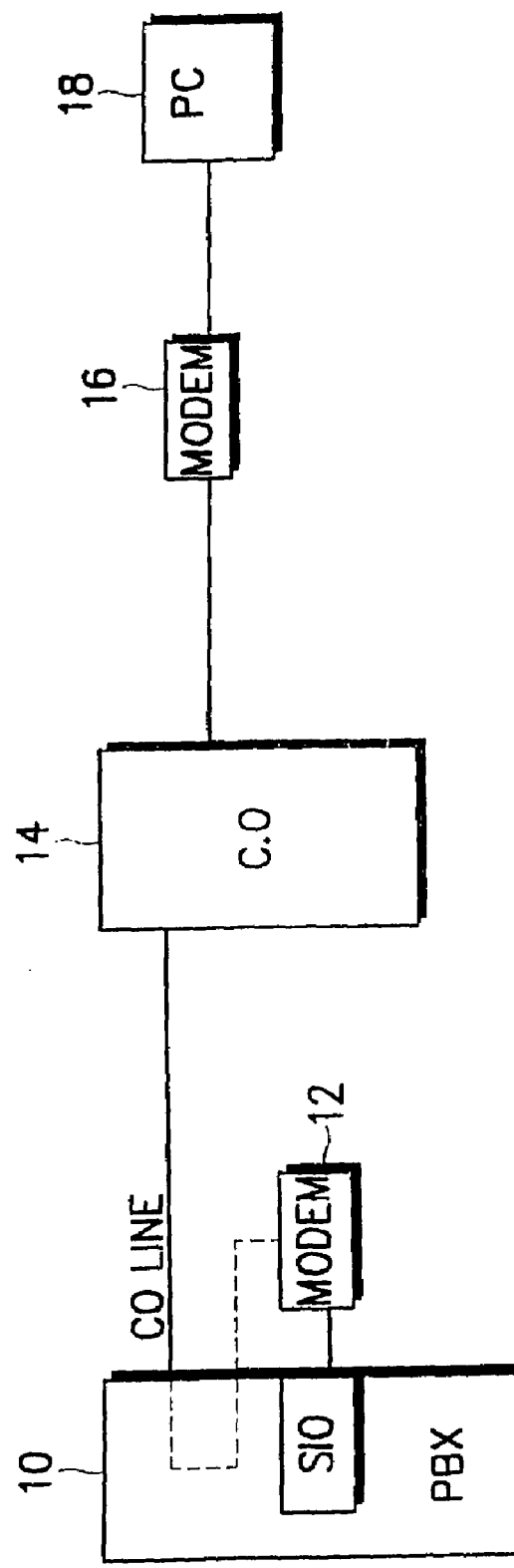
FIG. 1 illustrates remote connection to a conventional PBX though a modem.
Figure 2:
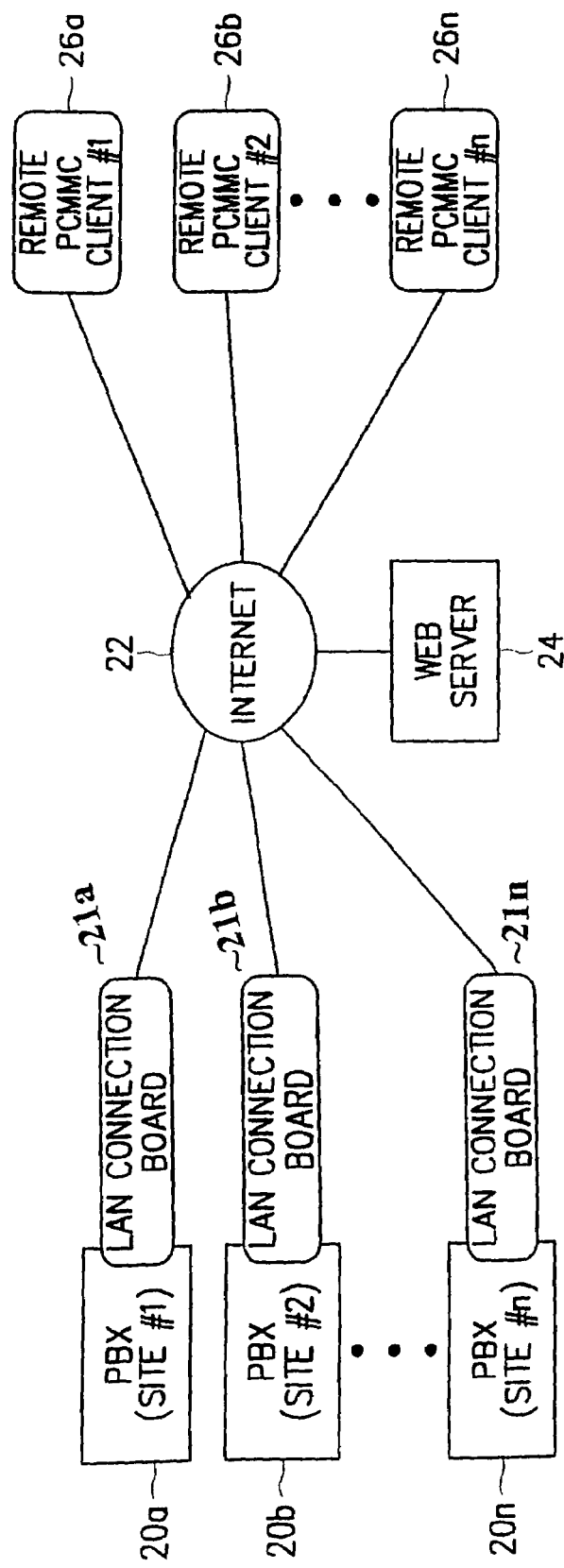
FIG. 2 is a block diagram utilized to describe a user programming method for a key phone system using a web server in a remote place according to an embodiment of the present invention.

FIG. 2 is a block diagram of a key phone system that utilizes a web server to describe a user programming method for a key phone system using a web server in a remote place, according to an embodiment of the present invention. Referring to FIG. 2, PBX systems 20a to 20n have LAN connection boards 21a-21n, each having a unique IP (Internet Protocol) address to connect to a LAN. The LAN is connected to the Internet 22 by routing. Clients 26a to 26n are also connected to the Internet 22 by LAN connection or PPP (Point-to-Point Protocol) connection to execute a remote program for Personal Computer Man Machine Communication (PCMMC).

A web server 24 is so configured to manage all databases and control connections associated with a client. The web server 24 is connected through Internet 22, to the PBX systems 20a to 20n.

A client is connected to web server 24 and authorized to update a database in a destination site after a predetermined authentication procedure. After updating the database, the client then requests uploading of the updated database to the web server 24 to upgrade the database of the system at the destination site.

Figure 3:
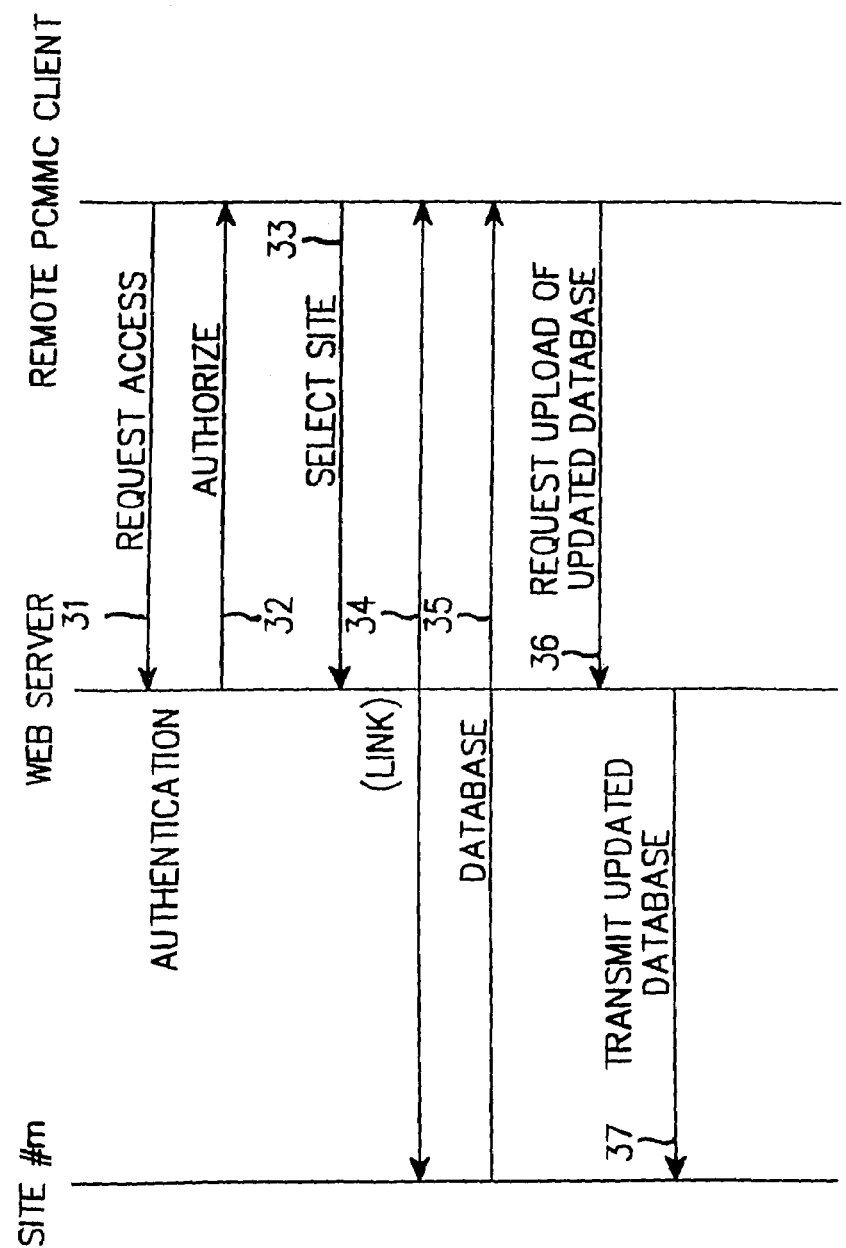
FIG. 3 is a message flow diagram for a user to program the PBX by using the web server according to the embodiment of the present invention.

FIG. 3 is a message flow diagram for user programming for the PBX using the web server 24 according to an embodiment of the present invention. Referring to FIG. 3, a client activates his web browser and requests access to the web server 24 to execute a PCMMC in step 31. In order to access the web server 24, the client requests access to the web server 24 by the IP of web server 24 and the web server 24 authenticates the access.

In step 32, after the client is authenticated, the web server 24 authorizes him to have access to web server 24. Next, in step 33, the client selects an intended site for programming. In step 34, the web server 24 connects the client to the database of the selected intended site.

In step 35, the client updates the database and stores the updated database. In step 36, the client requests the web server 24 to upload the updated database so that the updated database is transferred to the system of the intended site.

In the above-described procedure, the PCMMC can be implemented through the web server at any remote place as long as the Internet can be accessed. When the client application program of the PCMMC is updated, it can be readily updated in the web server because it is located at the web server 24. Furthermore, the client does not need to know information for connection to the PBX because he is connected to the web server without direct connection to the site system, and concentration of distributed PBX systems to one server facilitates control and analysis of updated information.

As described above, a client can update a user program in an intended site off line or on line by accessing a web server having the user program that is loaded via a LAN interface using a general web browser according to the present invention. Therefore, the present invention has the advantages of a simple and easy PCMMC execution, simple updating, and easy control and analysis of information.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A user programming system for a PBX (Private Branch Exchange), the system comprising:
   a connection board located at the PBX with a unique IP (Internet Protocol) address and connected to an Internet; and
   a web server being coupled to a remote client, the web server connected to the PBX through the Internet, for managing a database of the PBX of a user program for the PBX,
   wherein the remote client programs the PBX through the web server when the web server authorizes the remote client to update the database through a predetermined authentication procedure, and the web server uploads the database to the PBX upon receipt of an upload request for the database from the client.

2. The user programming system of claim 1, wherein the IP is a Point to Point to Point Protocol (PPP).

3. A user programming method for a key phone system, the method comprising:
   connecting a Local Area Network (LAN) connection board to the Internet;
   connecting a remote client to the Internet;
   connecting a web server, through the Internet, to the LAN connection board and the remote client;
   programming a destination PBX (Private Branch Exchange) by the remote client through the web server by authorizing the web server to update a database system in the destination PBX after a predetermined authentication procedure; and
   generating an upload request of the updated database to upload the database of the key phone system from the web server to the destination PBX.

4. The method of claim 3, wherein the LAN connection board is connected to the Internet by routing.

5. The method of claim 3, wherein the remote client is connected to the Internet through the LAN connection board to execute a remote program for a Personal Computer Man Machine Communication (PCMMC).

6. A method for sending a message by utilizing a user program for a PBX (Private Branch Exchange), the method comprising the steps of:
   connecting a Local Area Network (LAN) connection board in the PBX to a web server through the Internet;
   requesting access to the web server, by an Internet Protocol (IP) of the web server, to execute a Personal Computer Man Made Communications (PCMMC);
   authenticating, by utilizing the web server, access to the web server;
   selecting an intended PBX site with a PBX for programming;
   connecting a remote client to a database of the intended PBX site for programming the intended PBX site;
   updating the database and storing the updated database; and
   programming the intended PBX site by the remote client by requesting the web server to upload the updated database from the web server to the intended PBX site whereby the updated database is transferred to the PBX of the intended PBX site.

7. The method of claim 6, wherein the PCMMC can be implemented through the web server at a remote location.

* * * * *